US010532549B2

(12) United States Patent
Pierce et al.

(10) Patent No.: US 10,532,549 B2
(45) Date of Patent: *Jan. 14, 2020

(54) SPLICES COMPRISING HONEYCOMB CORES SUPPORTED BY TIE CLIPS AND METHODS OF FORMING THEREOF

(71) Applicant: The Boeing Company, Chicago, IL (US)

(72) Inventors: Evan F. Pierce, Auburn, WA (US); Mikel D. Marty, Auburn, WA (US); Francis W. Moore, Seattle, WA (US); Roger A. Bown, Seattle, WA (US); Megan E. Bliss, SeaTac, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/267,305

(22) Filed: Feb. 4, 2019

(65) Prior Publication Data
US 2019/0168497 A1 Jun. 6, 2019

Related U.S. Application Data

(63) Continuation of application No. 15/409,192, filed on Jan. 18, 2017, now Pat. No. 10,195,836.

(51) Int. Cl.
B32B 7/12 (2006.01)
B32B 37/12 (2006.01)
(Continued)

(52) U.S. Cl.
CPC ........... *B32B 37/146* (2013.01); *B29C 65/48* (2013.01); *B29C 65/562* (2013.01);
(Continued)

(58) Field of Classification Search
CPC .............. B32B 37/146; B29D 99/0089; B29L 2031/608
See application file for complete search history.

(56) References Cited

U.S. PATENT DOCUMENTS 2,035,304 A   3/1936   Dieffenbach
2,860,740 A   11/1958  Holland et al.
(Continued)

FOREIGN PATENT DOCUMENTS

EP   0293320 A2   11/1998
EP   2886317 A1   6/2015
(Continued)

OTHER PUBLICATIONS

"U.S. Appl. No. 15/409,192, Examiner Interview Summary dated May 22, 2018", 3 pages.
(Continued)

Primary Examiner — Mark A Osele
(74) Attorney, Agent, or Firm — Kwan & Olynick LLP

(57) ABSTRACT

Provided are splices, comprising honeycomb cores and adhesive layers with tie clips supporting the honeycomb cores. Also provided are methods of forming such splices. Each tie clip includes two legs and a bridging portion joining the legs. When forming a splice, an adhesive layer is positioned between two honeycomb cores. One leg of the tie clip is inserted into the full cell of one honeycomb core, while the other leg is inserted into the full cell of the other honeycomb core. The bridging portion extends across the adhesive layer. While curing the adhesive layer, the tie clip supports the honeycomb cores with respect to each other and maintains their orientation. The tie clip becomes a part of the splice. The tie clip may be buried in the honeycomb cores without extending above the first face of the splice.

20 Claims, 12 Drawing Sheets

(51) Int. Cl.
*B32B 37/14* (2006.01)
*B32B 3/12* (2006.01)
*B29C 65/48* (2006.01)
*B29D 99/00* (2010.01)
*F16B 11/00* (2006.01)
*F16B 5/00* (2006.01)
*B29C 65/56* (2006.01)
*B64F 5/40* (2017.01)
*B29L 31/60* (2006.01)

(52) U.S. Cl.
CPC ............ *B29D 99/0089* (2013.01); *B32B 3/12* (2013.01); *B32B 7/12* (2013.01); *B32B 37/12* (2013.01); *F16B 5/0064* (2013.01); *F16B 11/006* (2013.01); *B29L 2031/608* (2013.01); *B32B 2305/72* (2013.01); *B32B 2605/18* (2013.01); *B64F 5/40* (2017.01)

(56) References Cited

U.S. PATENT DOCUMENTS

| | | | |
|---|---|---|---|
| 3,716,435 | A | 2/1973 | Jensen et al. |
| 4,031,767 | A | 6/1977 | Guyer |
| 4,034,617 | A | 7/1977 | Guyer |
| 6,017,413 | A | 1/2000 | Franklin et al. |
| 6,029,418 | A | 2/2000 | Wright |
| 7,866,440 | B2 | 1/2011 | Douglas |
| 7,875,141 | B2 | 1/2011 | Bogue |
| 9,156,239 | B2 | 10/2015 | Hethcock et al. |
| 9,175,474 | B2 * | 11/2015 | May .................. E04C 2/365 |
| 9,623,621 | B2 | 4/2017 | Taylor et al. |
| 10,195,836 | B2 | 2/2019 | Pierce |
| 2014/0295123 | A1 | 10/2014 | Mizuno et al. |
| 2016/0293153 | A1 | 10/2016 | Taylor, Jr. et al. |
| 2018/0201008 | A1 | 7/2018 | Pierce et al. |

FOREIGN PATENT DOCUMENTS

| | | |
|---|---|---|
| FR | 1290476 A | 4/1962 |
| FR | 2189208 A1 | 1/1974 |
| FR | 2557932 A1 | 7/1985 |
| FR | 2588505 A1 | 4/1987 |
| GB | 544864 | 4/1942 |
| GB | 1013656 A1 | 12/1965 |

OTHER PUBLICATIONS

"U.S. Appl. No. 15/409,192, Non Final Office Action dated Mar. 21, 2018", 11 pages.
"U.S. Appl. No. 15/409,192, Notice of Allowance dated Sep. 18, 2018", 10 pages.
"European Application Serial No. 17203709.5, Search Report dated Jul. 16, 2018", 12 pgs.
"European Application Serial No. 17203709.5, Office Action dated Apr. 12, 2019", 6 pgs.
"European Application Serial No. 17203709.5, Office Action dated Nov. 15, 2019", 3 pgs.

* cited by examiner

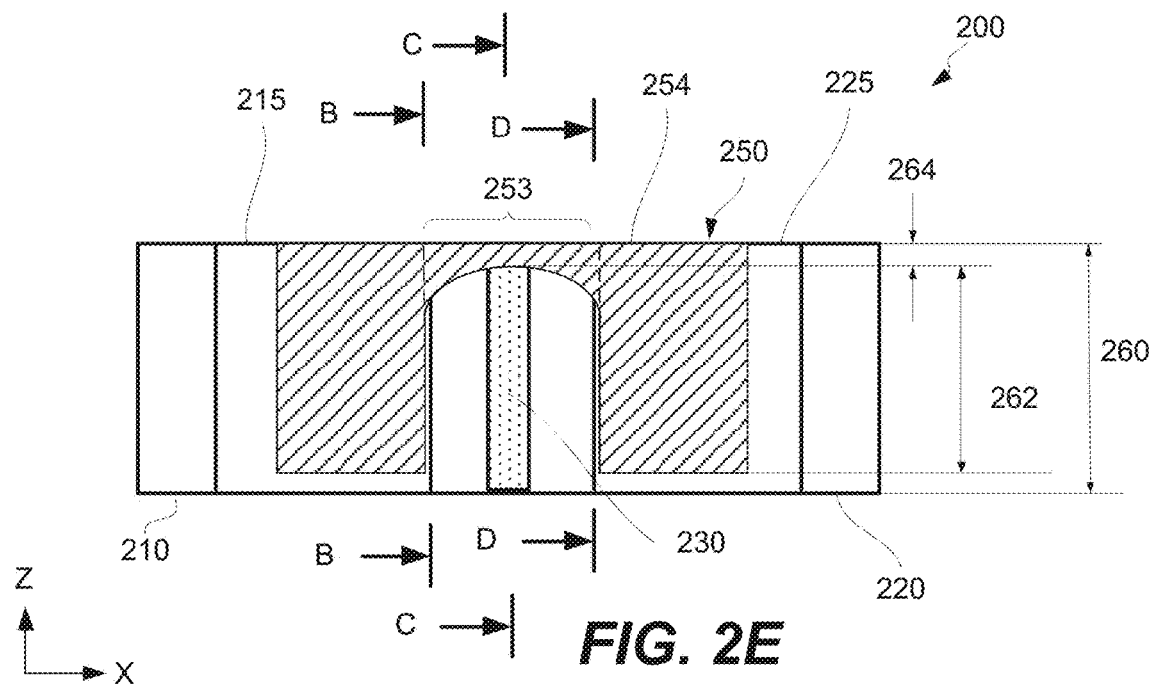
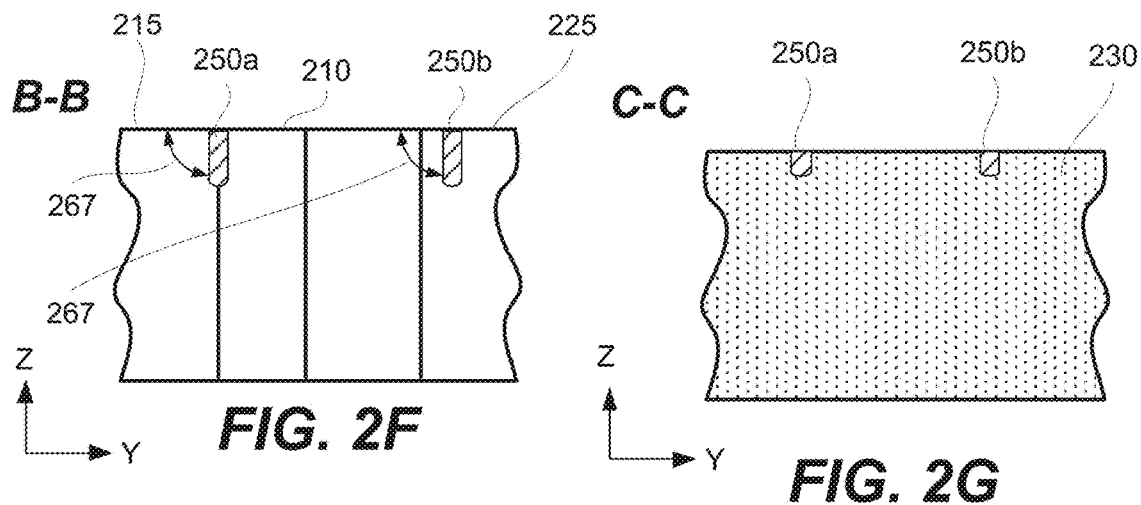
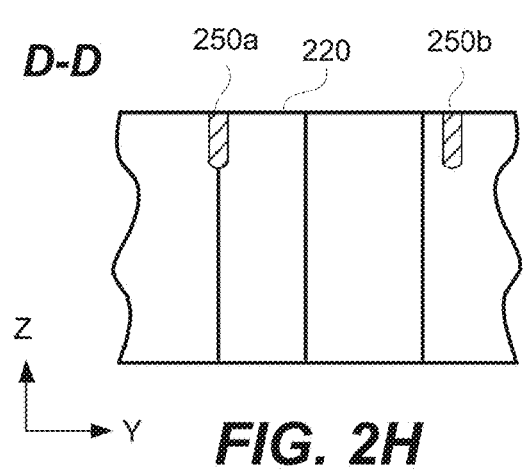

SPLICES COMPRISING HONEYCOMB CORES SUPPORTED BY TIE CLIPS AND METHODS OF FORMING THEREOF

CROSS-REFERENCE TO RELATED APPLICATIONS

This application is a continuation of U.S. patent application Ser. No. 15/409,192, entitled: "Splices Comprising Honeycomb Cores Supported by Tie Clips and Methods of Forming Thereof", filed on 2017 Jan. 18, which is incorporated herein by reference in its entirety for all purposes.

BACKGROUND

Various applications, such as applications requiring large components, often involve splicing honeycomb cores. The resulting spliced assemblies may be referred to as splices. The need for splicing occurs, for example, when initial structures have a limited size. Splices may be used for various aircraft applications, such as interior aircraft panels, padding devices design to absorb impact, and other like applications.

Honeycomb cores may be spliced using various adhesive. For example, cells of two honeycomb cores may be aligned, and these structures may be pushed into contact with an adhesive layer disposed between the structures. When curing this adhesive layer, the gap between the two structures may change, for example, because of expansion of the adhesive layer. Supporting the two structures may be challenging especially when the adhesive layer and the structures are covered by additional components, such as face sheets. For example, conventional solutions of using external removable supports do not allow integration of the face sheet into the adhesive curing process. The curing has to be performed without the face sheet. After the curing, these external supports are removed, and the face sheet is added and cured in a separate process. Another conventional approach is based on inserting a small piece of a honeycomb core across the splice interface to bridge the interface. However, this approach does not work well for many types of honeycomb cores, such as NOMEX® cores. When the bridging honeycomb piece is inserted over the two honeycomb cores, it shears the walls of these two honeycomb cores and may cause the overall splice to crush because of this wall cutting.

There is a need for new types of splices comprising adhered and supported honeycomb cores and new methods of forming thereof, in particular, for sandwiched honeycomb cores.

SUMMARY

Provided are splices comprising honeycomb cores and adhesive layers with tie clips supporting the honeycomb cores. Also provided are methods of forming such splices. Each tie clip includes two legs and a bridging portion joining the legs. When forming a splice, an adhesive layer is positioned between two honeycomb cores. One leg of the tie clip is inserted into the full cell of one honeycomb core, while the other leg is inserted into the full cell of the other honeycomb core. The bridging portion extends across the adhesive layer. While curing the adhesive layer, the tie clip supports the honeycomb cores with respect to each other and maintains their orientation. The tie clip becomes a part of the splice. The tie clip may be buried in the honeycomb cores without extending above the first face of the splice.

In some embodiments, a method of adhering two honeycomb cores comprises applying an adhesive layer between a first honeycomb core and a second honeycomb core, inserting a first plurality of tie clips into the first honeycomb core and into the second honeycomb core, and curing the adhesive layer while the first plurality of tie clips is inserted into the first honeycomb core and the second honeycomb core. When the adhesive layer is applied between the first honeycomb core and the second honeycomb core, the adhesive layer directly interfaces the first honeycomb core and the second honeycomb core.

In some embodiments, inserting the first plurality of tie clips into the first honeycomb core and the second honeycomb core comprises bridging a full cell of the first honeycomb core with a full cell of the second honeycomb core. This bridging of the full cell of the first honeycomb core with the full cell of the second honeycomb core may comprise inserting a first leg of each tie clip of the first plurality into a full cell of the first honeycomb core. The bridging may further comprises inserting a second leg of each tie clip of the first plurality into a full cell of the second honeycomb core.

In some embodiments, curing the adhesive layer comprises maintaining a set distance between the first honeycomb core and the second honeycomb core using the first plurality of tie clips. Curing the adhesive layer may also comprise adhering the first plurality of tie clips to the adhesive layer.

In some embodiments, prior to curing the adhesive layer, the method may comprise positioning a face sheet over the splice. The face sheet may interface the first honeycomb core, the second honeycomb core, the adhesive layer, and the first plurality of tie clips. In some embodiments, the method further comprises forming the face sheet and the first plurality of tie clips from a same material, such as a fiber reinforced material or, more specifically, a fiberglass. In some embodiments, the method further comprises forming the first plurality of tie clips from a pre-impregnated composite lamina sheet.

In some embodiments, inserting the first plurality of tie clips comprises positioning top edges of the first plurality of tie clips at a level or below a first face of the first honeycomb core and a first face the second honeycomb core. Specifically, inserting the first plurality of tie clips may comprise protruding a bridging portion of each tie clip of the first plurality into the adhesive layer, into a wall of the full cell of the first honeycomb core, and into a wall of the full cell of the second honeycomb core. In some embodiments, the method further comprises forming the first plurality of tie clips with a height of the bridging portion of each of the first plurality of tie clips being less than 10% of a height of the first honeycomb core or of the second honeycomb core.

In some embodiments, the method further comprises forming the first plurality of tie clips with a height of each of the first plurality of tie clips being at least 80% of a height of the first honeycomb core or of the second honeycomb core.

In some embodiments, inserting the first plurality of tie clips into the splice comprises aligning each tie clip in the first plurality such that an angle of each of the first plurality of tie clips relative to a first face of the first honeycomb core and a first face of second honeycomb core is substantially same. Alternatively, inserting the first plurality of tie clips into the splice comprises aligning each tie clip in the first plurality such that angles of tie clips of the first plurality of tie clips relative to the adhesive layer varies.

In some embodiments, the method further comprises forming the first plurality of tie clips having a first leg, a second leg parallel to the first leg, and a bridging portion extending between and connecting the first leg and the second leg.

In some embodiments, inserting the first plurality of tie clips into the splice comprises evenly distributing tie clips in the first plurality of tie clips along a length of the adhesive layer.

In some embodiments, curing the adhesive layer the adhesive layer comprises contacting a wall of a full cell of the first honeycomb core with a first leg of at least one of the first plurality of tie clips and contacting a wall of a full cell of the second honeycomb core with a second leg of the same one of the first plurality of tie clips.

In some embodiments, a first face of the first honeycomb core and a first face the second honeycomb core are non-planar after curing the adhesive layer.

In some embodiments, the method further comprises inserting a second plurality of tie clips into the splice. The bridging portions of the first plurality may be adjacent to a first face of the first honeycomb core. The bridging portions of the second plurality may be adjacent to a second face of the first honeycomb core opposite of the first face.

In some embodiments, at least one of the first plurality of tie clips and one of the second plurality of tie clips protrude into a same full cell of the first honeycomb core.

In some embodiments, inserting the first plurality of tie clips and inserting the second plurality of tie clips into the splice comprises inserting one of the first plurality of tie clips but no tie clips of the second plurality of tie clips into at least one full cell of the first honeycomb core.

In some embodiments, inserting a second plurality of tie clips into the splice comprises offsetting the second plurality of tie clips relative to the first plurality of tie clips along the adhesive layer.

In some embodiments, the first honeycomb core and the second honeycomb core form an aircraft structure.

Also provided is a splice comprising: a first core, a second core, an adhesive layer, disposed between and directly interfacing the first core and the second core, and a first plurality of tie clips inserted into and bridging the first core to the second core, the first plurality of tie clips being adhered to the adhesive layer.

In some embodiments, each tie clip of the first plurality of tie clips comprises a first leg, a second leg, and a bridging portion extending between the first leg and the second leg. The first leg of each tie clip is inserted into a full cell of the first honeycomb core. The second leg of each tie clip is inserted into a full cell of the second honeycomb core. The bridging portion extends across the adhesive layer, In some embodiments, the first core is a first honeycomb core, and wherein the second core is a second honeycomb core.

In some embodiments, the splice further comprises a face sheet positioned over the splice such that the face sheet interfaces the first honeycomb core, the second honeycomb core, the adhesive layer, and the first plurality of tie clips. The face sheet is bonded to the splice by the adhesive layer. Top edges of the first plurality of tie clips may be at a level or below the first face of the first honeycomb core and the first face the second honeycomb core. In some embodiments, the face sheet and the first plurality of tie clips are made from a same material, such as fiberglass.

In some embodiments, a bridging portion of each of the first plurality of tie clips protrudes into the adhesive layer, into a wall of the full cell of the first honeycomb core, and into a wall of the full cell of the second honeycomb core. The height of the bridging portion of each of the first plurality of tie clips may be less than 10% of a height of the first honeycomb core or of the second honeycomb core.

In some embodiments, the height of each of the first plurality of tie clips is at least 80% of a height of the first honeycomb core or of the second honeycomb core. The angle of each of the first plurality of tie clips relative to the first face of the first honeycomb core and the first face of second honeycomb core may be substantially same. In some embodiments, the angles of tie clips of the first plurality of tie clips relative to the adhesive layer varies. The first plurality of tie clips is made from a pre-impregnated composite lamina sheet.

In some embodiments, tie clips in the first plurality of tie clips are evenly distributed along a length of the adhesive layer. Spacing between each pair of adjacent tie clips in the first plurality of tie clips may be between about 1 inch and 5 inches.

In some embodiments, the adhesive layer is in contact with a wall of the full cell of the first honeycomb core and wherein the second leg of the same one of the first plurality of tie clips is in contact with a wall of the full cell of the second honeycomb core.

In some embodiments, the splice is non-planar after curing the adhesive layer.

In some embodiments, the splice further comprises a second plurality of tie clips inserted into the splice on a side of the splice opposite of the first plurality of tie clips. At least one of the first plurality of tie clips and one of the second plurality of tie clips may protrude into a same full cell of the first honeycomb core. At least one full cell of the first honeycomb core may receive one of the first plurality of tie clips but no tie clips of the second plurality of tie clips. The first plurality of tie clips may be offset relative to the second plurality of tie clips along the adhesive layer.

These and other embodiments are described further below, with reference to the figures.

BRIEF DESCRIPTION OF THE DRAWINGS

FIG. 2E is a schematic cross-sectional side view of another example of the splice of FIG. 2A, in accordance with some embodiments.

FIG. 2F is a schematic cross-sectional side view of the splice of FIG. 2E illustrating the bridging portion of the tie clip protruding into the wall of the full cell of the first honeycomb core, in accordance with some embodiments.

FIG. 2G is a schematic cross-sectional side view of the splice of FIG. 2E illustrating the bridging portion of the tie clip protruding into the adhesive layer, in accordance with some embodiments.

FIG. 2H is a schematic cross-sectional side view of the splice of FIG. 2E illustrating the bridging portion of the tie clip protruding into the wall of the full cell of the second honeycomb core, in accordance with some embodiments.

DETAILED DESCRIPTION

Figure 1:
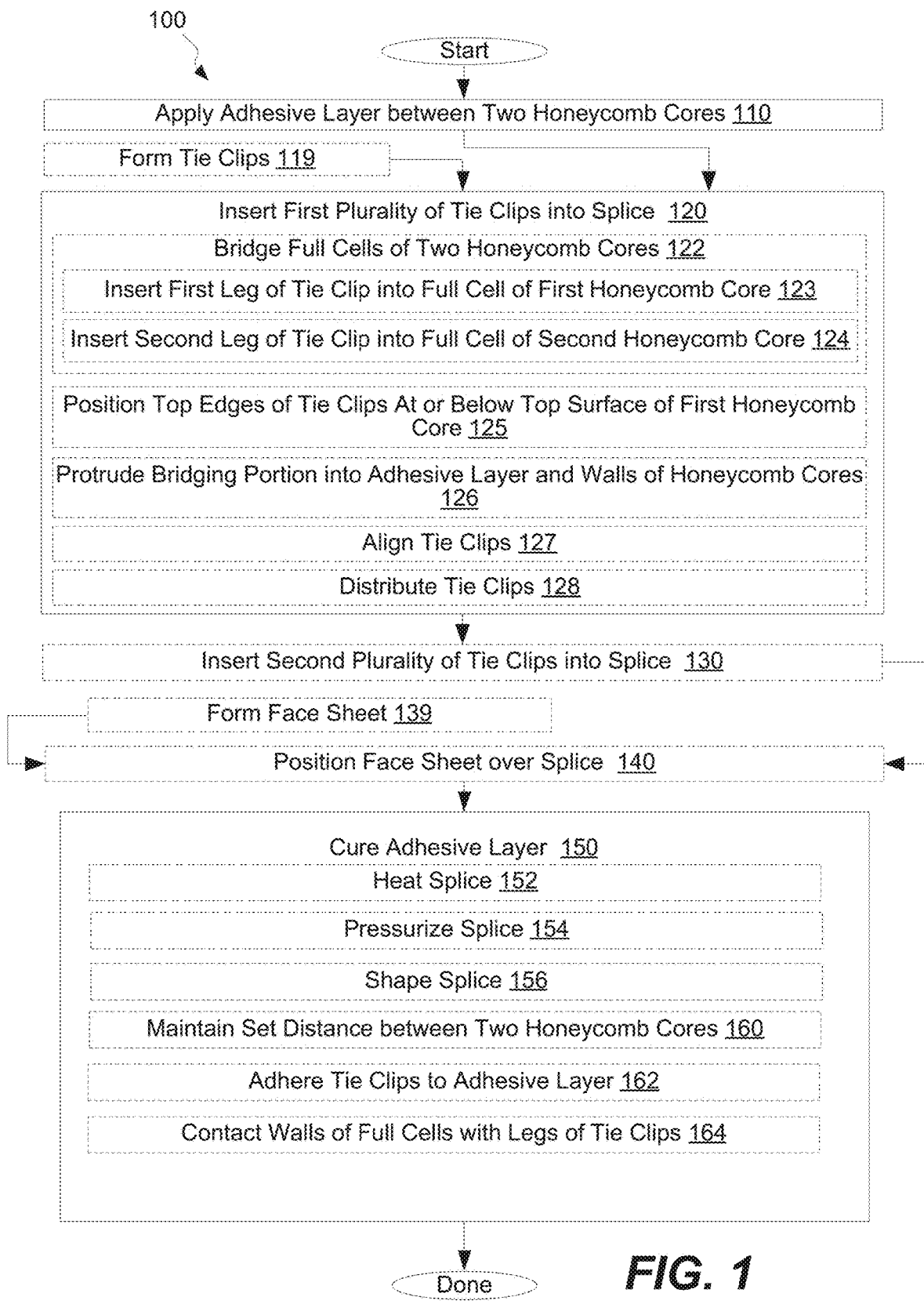
FIG. 1 is a process flowchart of a method of adhering two honeycomb cores, in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

INTRODUCTION

When two honeycomb cores are bonded together used an adhesive layer (e.g., adhesive foam), the adhesive layer may expand during its curing and push the cores apart. As a result, the assembly (splice) formed by bonding the two honeycomb cores with the adhesive layer needs to be inspected and, in some instances, discarded. Furthermore, for visual inspection, the initial assembly must be cured separate from a face sheet in order to see the adhesive layer after curing. Otherwise, when the face sheet is cured together with the adhesive layer, the inspection has to be performed using complex and expensive techniques (e.g., X-Ray).

Spliced honeycomb assemblies or simply splices described herein are formed with no or minimal impact to the walls of the honeycomb cores while maintaining a set gap between spliced honeycomb cores. A splice includes tie clips supporting the honeycomb cores while curing the adhesive layers and preventing excessive expansion of the adhesive layer. Specifically, each tie clip includes two legs and a bridging portion extending between and joining the legs. One leg of this tie clip is inserted into a full cell of one honeycomb core, while the other leg is inserted into a full cell of the other honeycomb core. The full cells receiving different legs of the same tie clip may be adjacent full cells of the two honeycomb cores. The bridging portion extends across an adhesive layer and collectively with the legs maintain orientation of the full cells with respect to each other. Multiple tie clips may be inserted along the adhesive layer and collectively these clips maintain orientation of the two honeycomb cores. While the bridging portion may come in contact with the adhesive layer, the legs may be disposed in the full cells of the honeycomb cores that are substantially free from the adhesive. Limiting the adhesive to fewer cells of the honeycomb cores may be used to keep down the weight of the overall assembly.

While curing the adhesive layer, the tie clips support the honeycomb cores with respect to each other and prevent their separation due to, for example, expansion of the adhesive layer. After curing, the tie clip remains in the splice and may be also bonded to the adhesive layer. In some embodiments, the face sheet may be adhered to the splice assembly while curing of the adhesive layer. This approach of using embedded tie clips allows to expedite processing. For example, the splice may be cured together with the face sheet and the embedded tie clips under the face sheet. Furthermore, adding embedded tie clips eliminates the need for complex post cure inspections (e.g., X-Ray) since the embedded tie clips maintain registration of the two honeycomb cores relative to each other.

Examples of Splices and Methods of Forming Such Splices

Figure 2A:
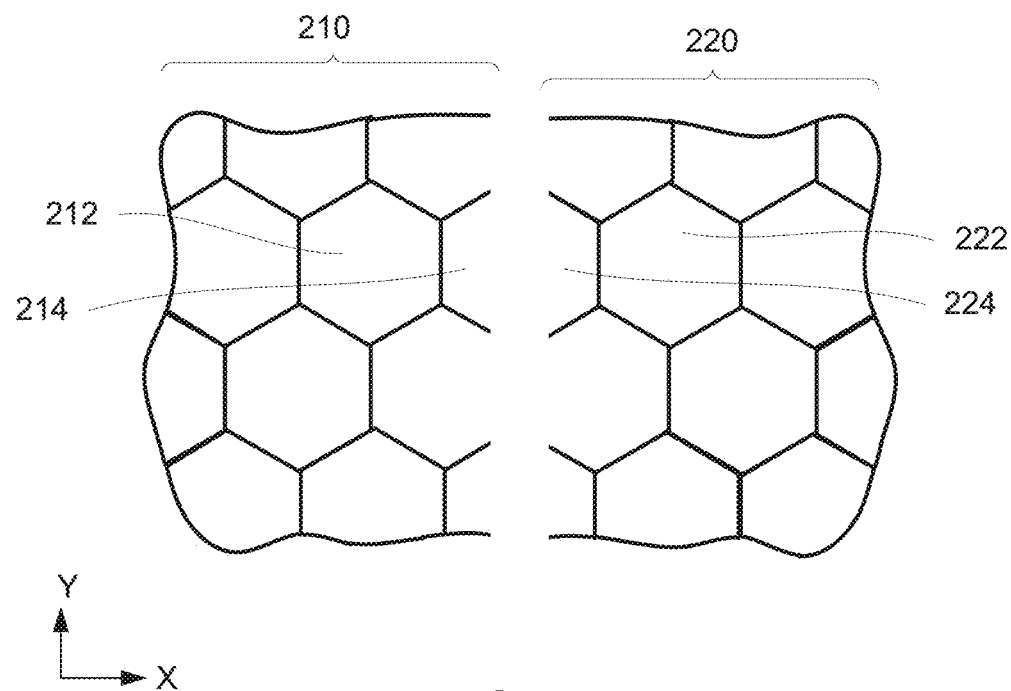
FIG. 2A is a schematic top view of two honeycomb cores prior to adhering these cores, in accordance with some embodiments.
Figure 2B:
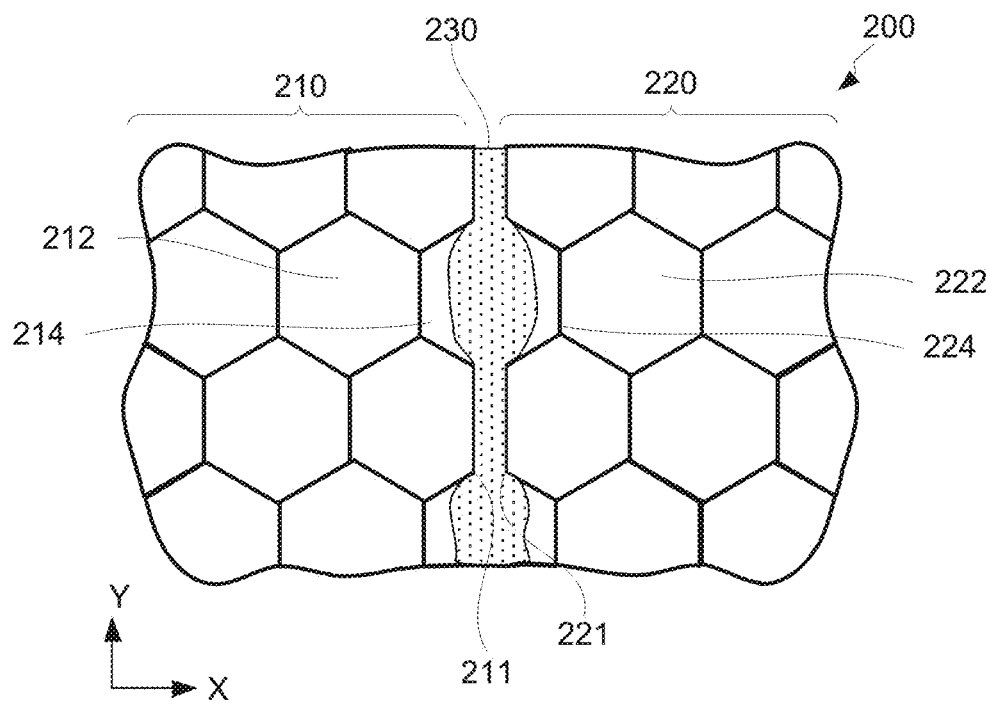
FIG. 2B is a schematic top view of two honeycomb cores with an adhesive layer disposed between and interfacing these honeycomb cores, in accordance with some embodiments.

FIG. 1 is a process flowchart of method 100 of adhering two honeycomb cores 210 and 220, in accordance with some embodiments. Two honeycomb cores 210 and 220 are shown in FIG. 2A prior to executing method 100. Method 100 comprise operation 110, which involves applying adhesive layer 230 between first honeycomb core 210 and second honeycomb core 220. Splice 200 shown in FIG. 2B is formed during this operation. Adhesive layer 230 is not yet cured at this stage.

FIG. 2A is a schematic top view of first honeycomb core 210 and second honeycomb core 220 prior to operation 110, while FIG. 2B is a similar schematic top view of partially formed splice 200 after completing operation 110. Splice 200 comprises first honeycomb core 210, second honeycomb core 220, and adhesive layer 230 disposed (e.g., sandwiched) between and interfacing first honeycomb core 210 and second honeycomb core 220. Splice does not include tie clips 250 at this stage.

First honeycomb core 210 includes full cells 212. Unlike partial cells 214, full cells 212 have a complete periphery with all walls intact. Full cells 212 are later used for receiving tie clips 250. First honeycomb core 210 may also include partial cells 214, which have portions of walls removed and incomplete peripheries. When present, partial cells 214 are not be used for insertion of tie clips 250. Unlike full cells 212, partial cells 214 may not be able to restrict legs of tie clips 250 in directions parallel to first face 215 of first honeycomb core 210.

In a similar manner, second honeycomb core 220 includes full cells 222, which have all walls intact. Full cells 222 are later used for insertion of tie clips 250. Second honeycomb core 220 may also include partial cells 224, which have portions of walls removed, and which will not be used for insertion of tie clips 250.

In some embodiments, first honeycomb core 210 is aligned relative to second honeycomb core 220 along adhesive layer 230 (the Y direction in FIG. 2B). For example, wall edges 211 of partial cells 214 may coincide with wall edges 221 of partial cells 224 as, for example, shown in FIG. 2B. In some embodiments, wall edges 211 of partial cells 214 may be offset relative wall edges 221 of partial cells 224 along adhesive layer 230.

Figure 2C:
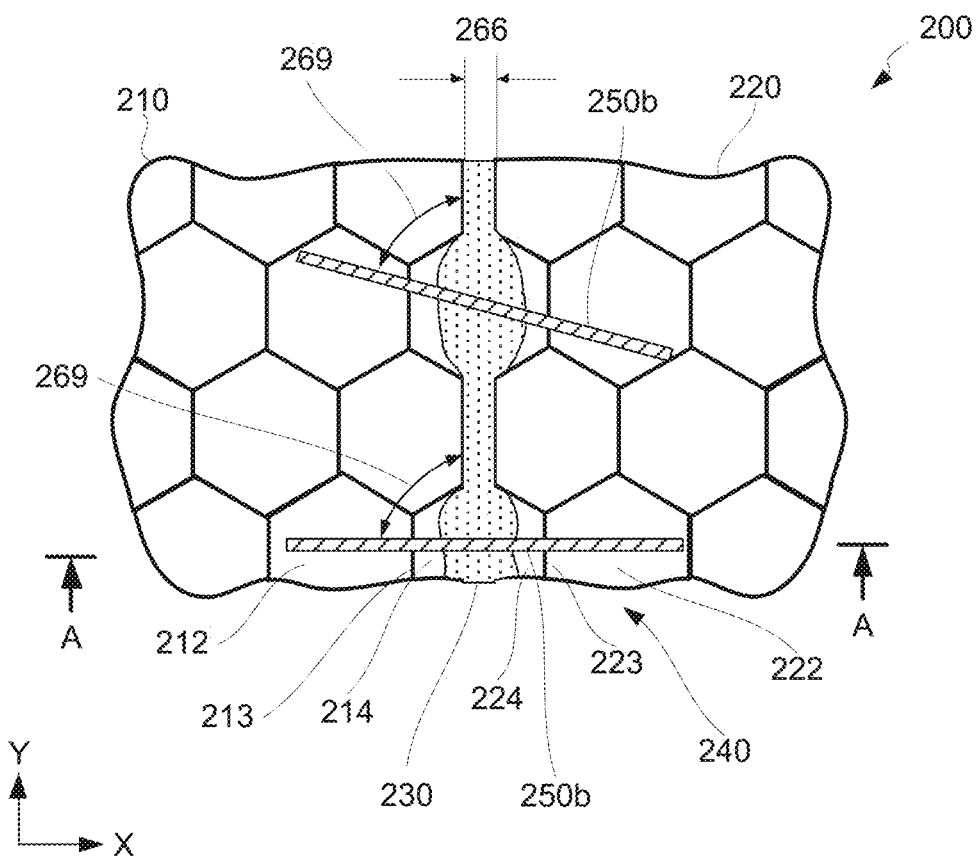
FIG. 2C is a schematic top view of a splice including two honeycomb cores with an adhesive layer disposed between and interfacing these honeycomb cores and a plurality of tie clips inserted into full cells of these honeycomb cores, in accordance with some embodiments.

When partial cells 214 and partial cells 224 are present, adhesive layer 230 may partially penetrate in these partial cells while forming splice 200 as, for example, shown in FIG. 2B and, in some embodiments, later while curing adhesive layer 230 as, for example, shown in FIG. 2C. This adhesive penetration feature provides a larger interface area between adhesive layer 230 and first honeycomb core 210 and between adhesive layer 230 and second honeycomb core 220. Furthermore, this feature (adhesive expanding into partial cells 214 and 224) provides space for adhesive layer 230 to expand into during its curing while maintaining the same spacing between first honeycomb core 210 and second honeycomb core 220.

Method 100 may involve forming first plurality 240 of tie clips 250 during operation 119. For example, first plurality 240 of tie clips 250 may be formed with height 264 of bridging portion 253 of each of first plurality 240 of tie clips 250 being less than 10% of a height 260 of first honeycomb core 210 or of second honeycomb core 220. In some embodiments, first plurality 240 of tie clips 250 may be formed with height 262 of each of first plurality 240 of tie clips 250 being at least 80% of a height 260 of first honeycomb core 210 or of second honeycomb core 220. First plurality 240 of tie clips 250 may be formed from a pre-impregnated composite lamina sheet. In some embodiments, first plurality 240 of tie clips 250 are formed having a first leg 251, a second leg 252 parallel to first leg 251, and a bridging portion 253 extending between and connecting first leg 251 and second leg 252.

Figure 2D:
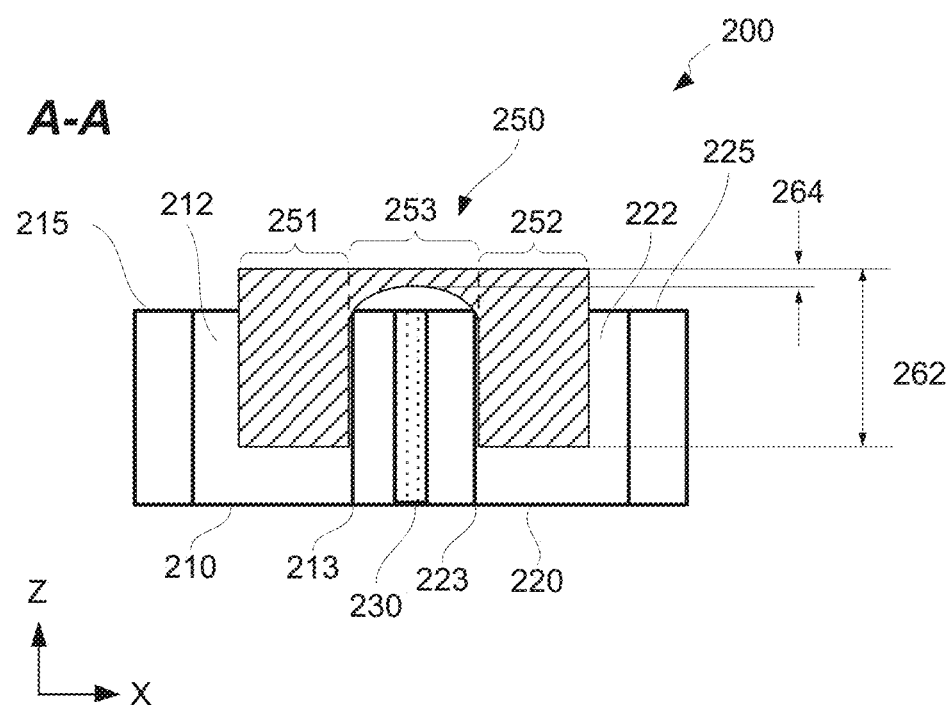
FIG. 2D is a schematic cross-sectional side view of the splice of FIG. 2A illustrating position of a tie clips within the splice, in accordance with some embodiments.

Method 100 may proceed with inserting first plurality 240 of tie clips 250 into splice 200 or, more specifically into first honeycomb core 210 and into second honeycomb core 220 during operation 120 (referring to FIG. 1). FIGS. 2C-2E and FIG. 3 illustrate different views and examples of splice 200 after completing operation 120. Referring to FIG. 2D, each tie clip 250 comprises first leg 251, second leg 252, and bridging portion 253, which extends between and joins first leg 251 and second leg 252. For purposes of this disclosure, first leg 251 and second leg 252 are defined as portions of tie clip 250 that extend the entire height 262 of tie clip 250. Height 264 of bridging portion 253 is less than the entire height 262 of tie clip 250. Depending on the design of tie clip 250, height 264 of bridging portion 253 may be variable as it extends between first leg 251 and second leg 252 (the X direction in FIG. 2D). Each of first plurality 240 of tie clips 250 may have a U-shape. Height 262 of tie clips 250 may at least 60% of height 260 of first honeycomb core 210 or of second honeycomb core 220 as shown in FIG. 2E or, more specifically, at least about 70% or even at least about 80% or at least about 90%.

During operation 120, first leg 251 of tie clip 250 is inserted into full cell 212 of first honeycomb core 210 as shown in FIGS. 2D and 2E. Likewise, second leg 252 of tie clip 250 is inserted into full cell 222 of second honeycomb core 220. Bridging portion 253 extends across adhesive layer 230. Referring to FIG. 2F, angle 267 of each tie clips 250 relative to first face 215 of first honeycomb core 210 and first face 225 of second honeycomb core 220 may be substantially same. Specifically, this angle 267 may be about 90°. Referring to FIG. 2C, angles 269 of tie clips 250 relative to adhesive layer 230 may vary. Some clips (e.g., tie clip 250b in FIG. 2C) may be at an angle of about 90° relative to adhesive layer 230. However, tie clip 250a in FIG. 2C has a different angle. Angle 269 may depend on orientation of the two full cells which receive the legs of tie clip 250a. Angle 269 may also depend on the size and shape of the full cells relative to the size and shape of the legs and ability of the legs to turn and move with the legs during insertion and later. The difference in angle 269 may be due to relative positions of full cells 212 and 222 along adhesive layer as well as sizes of full cells 212 and 222 and legs 251 and 262. Furthermore, bridging portions 253 with different lengths may be used in some embodiments.

In some embodiments, first plurality 240 of tie clips 250 is made from a pre-impregnated composite lamina sheet, (e.g., fiber reinforced tie clips 250). Selection of materials for tie clips 250 may depend on materials of first honeycomb core 210, second honeycomb core 220, adhesive layer 230, and/or face sheet 270 (if one is used). For example, the material of tie clips 250 may have a coefficient of thermal expansion (CTE) that is within 50% or even within 25% of CTEs of other components around tie clips 250.

Figure 3:
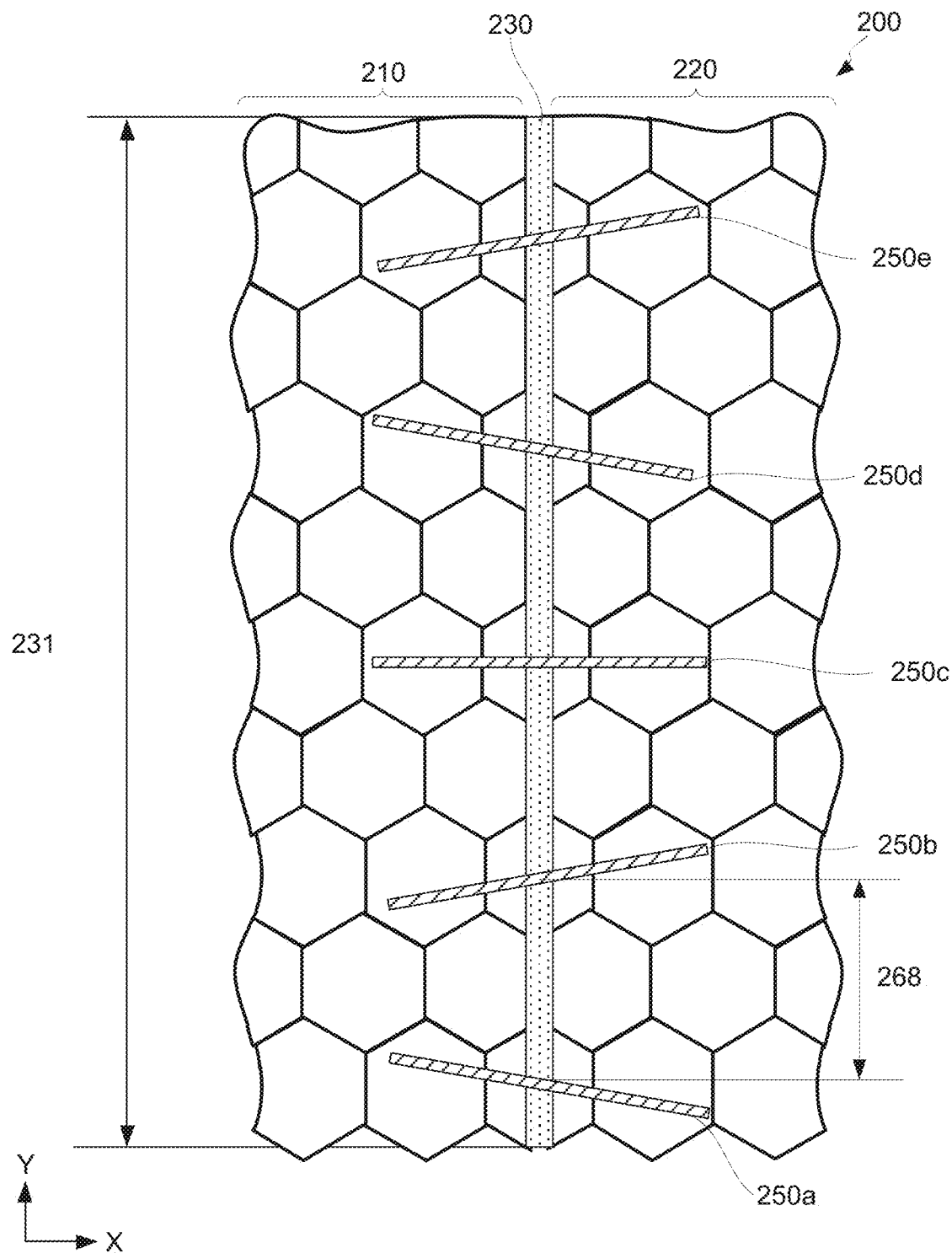
FIG. 3 is a schematic top view of a splice showing distributing of tie clips along the adhesive layer, in accordance with some embodiments.
Figure 4:
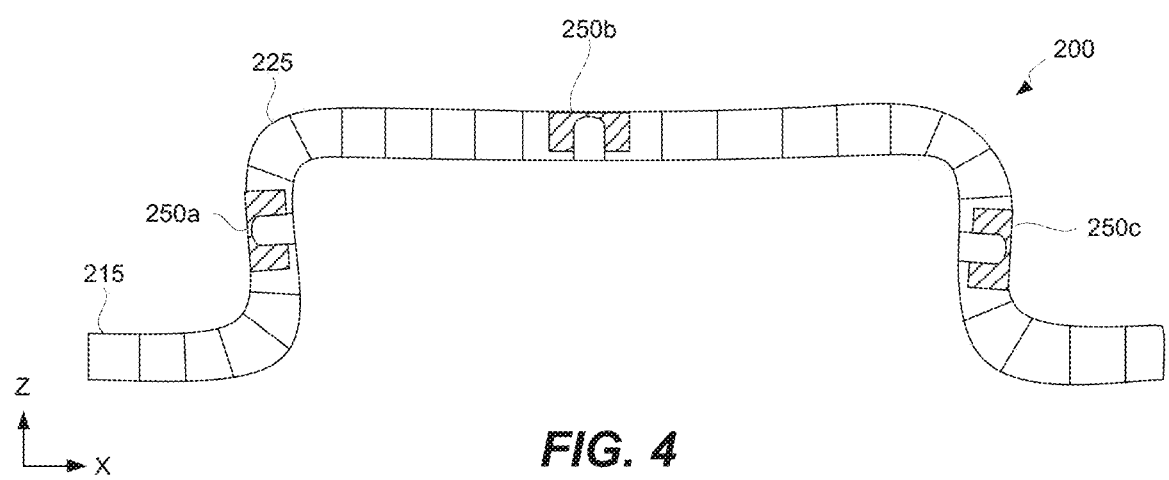
FIG. 4 is a schematic cross-sectional side view of a non-planar splice, in accordance with some embodiments.

Referring to FIG. 3, tie clips 250 may be evenly distributed along length 231 of adhesive layer 230. For example, spacing 268 between each pair of adjacent tie clips 250 may vary by less than 50% from average spacing 268 or even less than 25% or even less than 10%. Average spacing 268 between each pair of adjacent tie clips 250 in first plurality 240 may be between about 1 inch and 5 inches or, more specifically, between about 2 inches and 4 inches. The spacing may be determined based on support needed for honeycomb cores 210 and 220. Furthermore, the spacing may be determined based on characteristics of adhesive layer 230. Additional factors include the cell height, the wall thickness of the cell, adhesive properties (e.g., material, thickness, coefficient of thermal expansion), assembly requirements. In some embodiments, tie clips 250 can be used to maintain registration of first honeycomb core 210 and second honeycomb core 220 that are non-planar (e.g., countered) either while forming (e.g., curing) splice 200 or at later operations. One example of such non-planar splice 200 is shown in FIG. 4 and described below with reference to this figure.

After tie clips 250 are inserted into splice 200, a portion of tie clips 250 may extend above first face 215 of first honeycomb core 210 and also above first face 225 of second honeycomb core 220 as, for example, shown in FIG. 2D. In this example, bridging portion 253 may extend over walls 213 of first honeycomb core 210 and walls 223 of second honeycomb core 220 and not cut into these walls 213 and 223. Furthermore, bridging portion 253 may extend over adhesive layer 230 rather than cutting into adhesive layer 230. This example may be used when extending tie clips above first faces 215 and 225 is acceptable and/or when cutting into these walls 213 and 223 should be avoided. Bridging portion 253 may have small height 264 in these examples.

Alternatively, the top edge of tie clips 250 may be at the same level with first faces 215 and 225 as, for example, shown in FIG. 2E. In this example, top edges 254 of tie clips 250 are at the level (as shown in FIG. 2E) or below first face 215 of first honeycomb core 210 and first face 225 second honeycomb core 220. In this example, while inserting first plurality 240 of tie clips 250 into splice 200, bridging portion 253 may protrude into adhesive layer 230, into wall 213 of full cell 212 of first honeycomb core 210, and into wall 223 of full cell 222 of second honeycomb core 220. Height 264 (e.g., average height 264, if this height is variable) of bridging portion 253 of tie clips 250 may be less than 10% of height 260 of first honeycomb core 210 or of second honeycomb core 220 or even less than 5%. As such, distortions to walls 213 and 223 are minimal. This example may be used when planar first face 201 of splice 200 is needed. For example, first face 201 may receive face sheet 270 at a later operation. It should be noted that at least portions of first faces 215 and 225 adjacent to adhesive layer 230 may be coplanar.

As such, operation 120 (inserting first plurality 240 of tie clips 250 into first honeycomb core 210 and second honeycomb core 220) may comprise bridging full cell 212 of first honeycomb core 210 with full cell 222 of second honeycomb core 220, which is reflected as sub-operation 122 in FIG. 1. This bridging sub-operation 122 may comprise inserting first leg 251 of each tie clip 250 of first plurality 240 into full cell 212 of first honeycomb core 210 (sub-operation 123) and may further comprises inserting 120 second leg 252 of each tie clip 250 of first plurality into full cell 222 of second honeycomb core 220 (sub-operation 124).

In some embodiments, inserting first plurality 240 of tie clips 250 during operation 120 comprises positioning top edges 254 of first plurality 240 of tie clips 250 at a level or below a first face 215 of first honeycomb core 210 and a first face 225 second honeycomb core 220 as reflected by sub-operation 125 in FIG. 1. Furthermore, inserting operation 120 may comprise protruding bridging portion 253 of each tie clip of first plurality 240 into adhesive layer 230, into wall 213 of full cell 212 of first honeycomb core 210, and into wall 223 of full cell 222 of second honeycomb core 220 as reflected by sub-operation 126 in FIG. 1.

In some embodiments, inserting 120 first plurality 240 of tie clips 250 comprises aligning each tie clip 250 in first plurality such that an angle 267 of each of first plurality 240 of tie clips 250 relative to a first face 215 of first honeycomb core 210 and a first face 225 of second honeycomb core 220 is substantially same, as reflected by sub-operation 127 in FIG. 1. Sub-operation 127 may involve aligning each tie clip 250 in first plurality such that angles 269 of tie clips 250 of first plurality 240 of tie clips 250 relative to adhesive layer 230 varies. Inserting operation 120 may also comprise evenly distributing tie clips 250 in first plurality 240 of tie clips 250 along a length 231 of adhesive layer 230 as reflected by sub-operation 128 in FIG. 1.

Figure 5A:
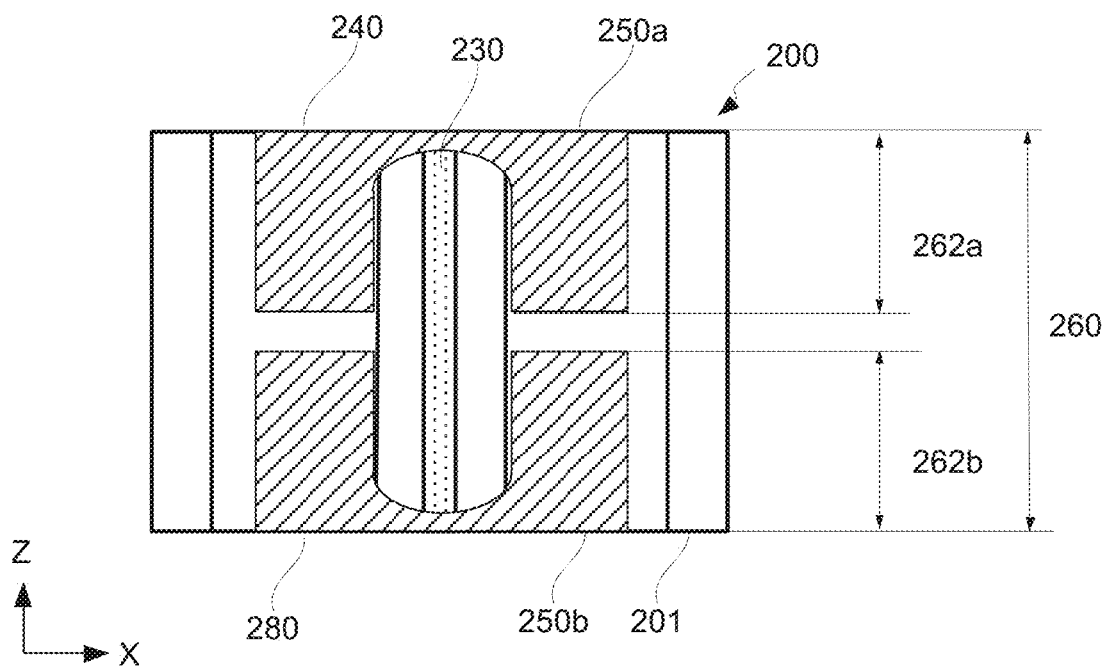
FIG. 5A is a schematic cross-sectional side view of a splice having two pluralities of tie clips inserted from opposite sides of the honeycomb cores, in accordance with some embodiments.

In some embodiments, method 100 also involves inserting second plurality 280 of tie clips 250 into splice 200 during optional operation 130 (referring to FIG. 1). As shown in FIG. 5A, second plurality 280 is inserted on side 201 of splice 200 opposite of first plurality 240. Tie clips 250 in first plurality 240 may be the same or different as tie clips 250 in second plurality 280.

Figure 5B:
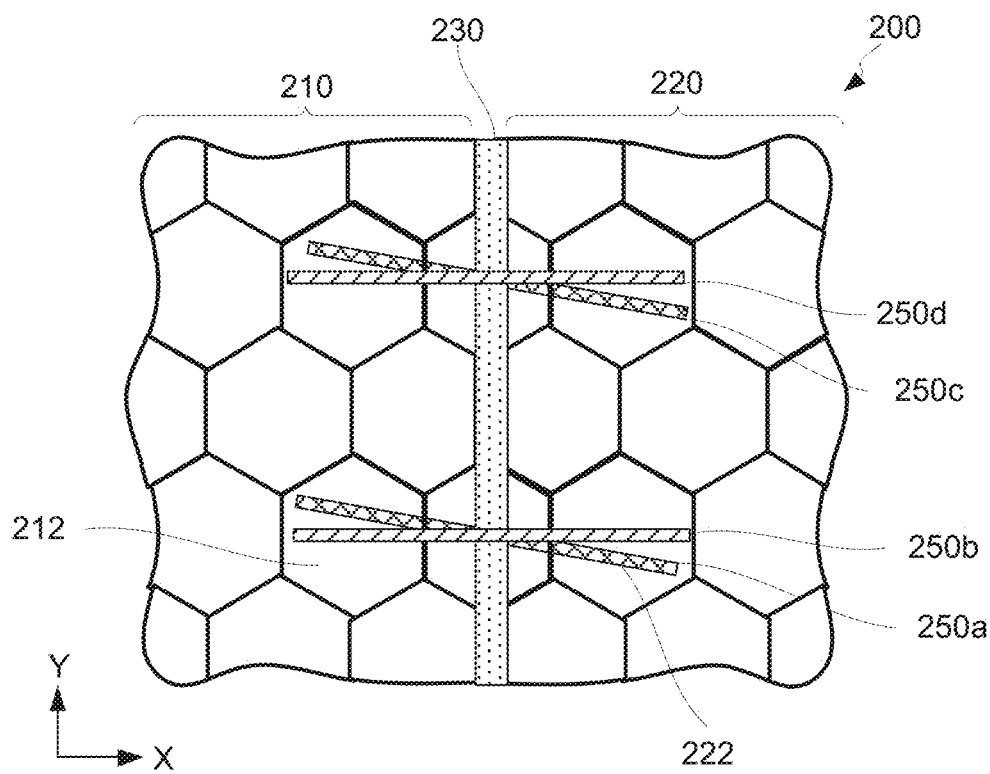
FIG. 5B is a schematic top view of the splice of FIG. 5A showing orientation of the two pluralities of tie clips, in accordance with some embodiments.

Tie clips 250 of first plurality 240 and second plurality 280 may be inserted into the same or different full cells of honeycomb cores 210 and 220. Referring to FIG. 5B, tie clip 250a of first plurality 240 and tie clip 250b of second plurality 280 protrude into same full cell 212 of first honeycomb core 210. The same tie clips 250a and 250b also protrude into same full cell 222 of second honeycomb core 210. Tie clips 250a and 250b may or may not overlap in these cells along structures' height 260. Referring to the example illustrated in FIG. 5A where tie clips 250a and 250b do not overlap, a combination of tie heights 262s and 262b may be less than structure height 260. Alternatively, tie clips 250 of first plurality 240 may overlap with tie clips 250 of second plurality 280 in the same cells. Specifically, a combination of tie height 262a and tie height 262b may be greater that structure height 260. In some embodiments, each of tie height 262a and tie height 262b may greater than the half of structure height 260.

Figure 5C:
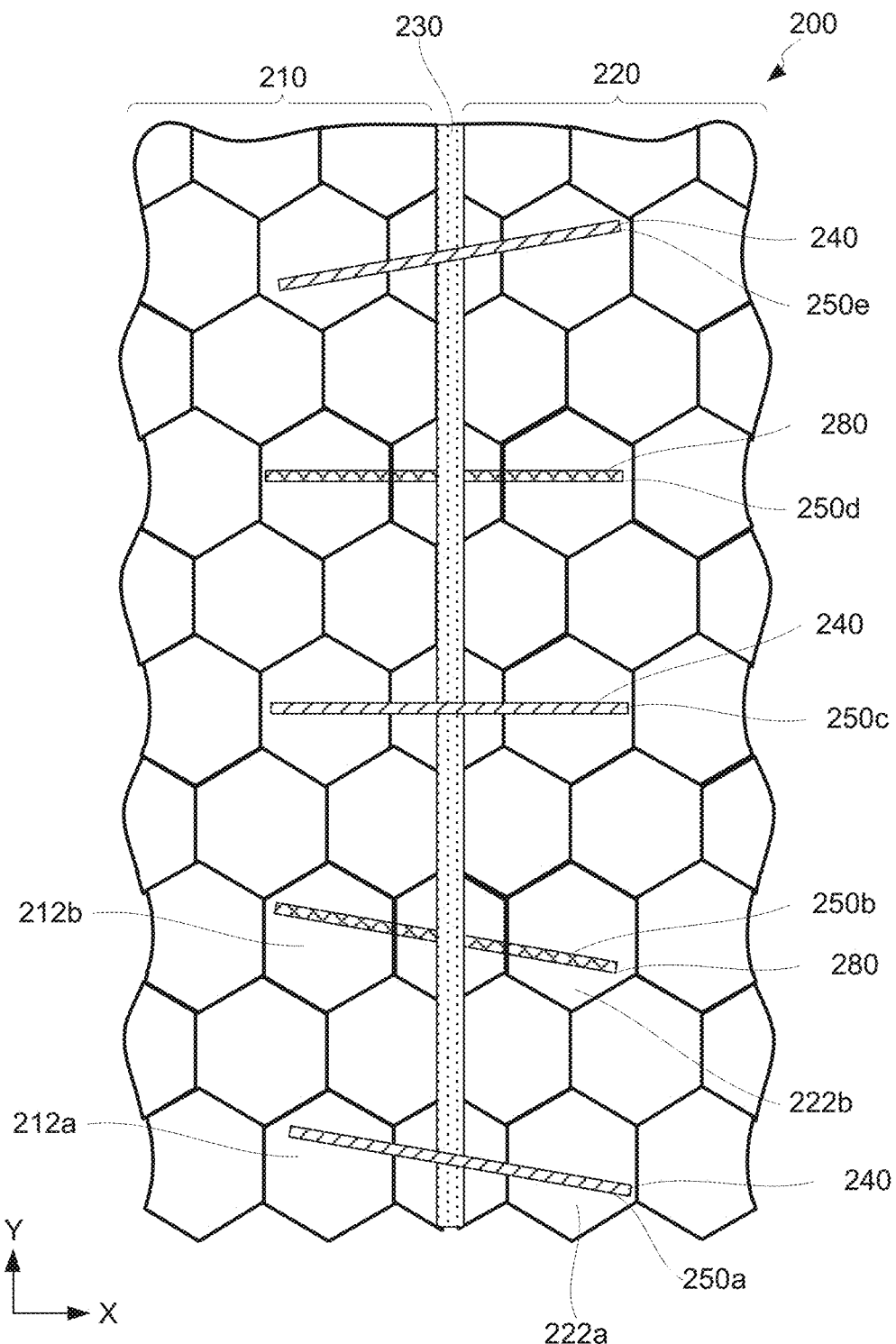
FIG. 5C is a schematic top view of the splice of FIG. 5A showing another example of orientation of the two pluralities of tie clips, in accordance with some embodiments.

Referring to FIG. 5C, in some embodiments, at least one full cell 212a of first honeycomb core 210 receives one tie clip 250a of first plurality 240 but no tie clips of second plurality 280 of tie clips. Specifically, tie clip 250a is inserted into full cell 212a and full cell 222a. Neither one of tie clips 250b and 250d of second plurality 280 is inserted into either full cell 212a and full cell 222a. In a similar manner, tie clip 250b of second plurality 280 is inserted into full cell 212b and full cell 222b. Neither one of tie clips 250a, 250c, and 250e of first plurality 240 is inserted into either full cell 212b and full cell 222b. In this example, first plurality 240 of tie clips is offset relative to second plurality 280 of tie clips along adhesive layer 230.

In some embodiments, method 100 also involves positioning face sheet 270 over splice 200 during optional operation 140 (refer to FIG. 1). Operation 140 is performed prior to curing adhesive layer 230. As such, when adhesive layer 230 is later cured, face sheet 270 is also bonded to splice 200.

Figure 2I:
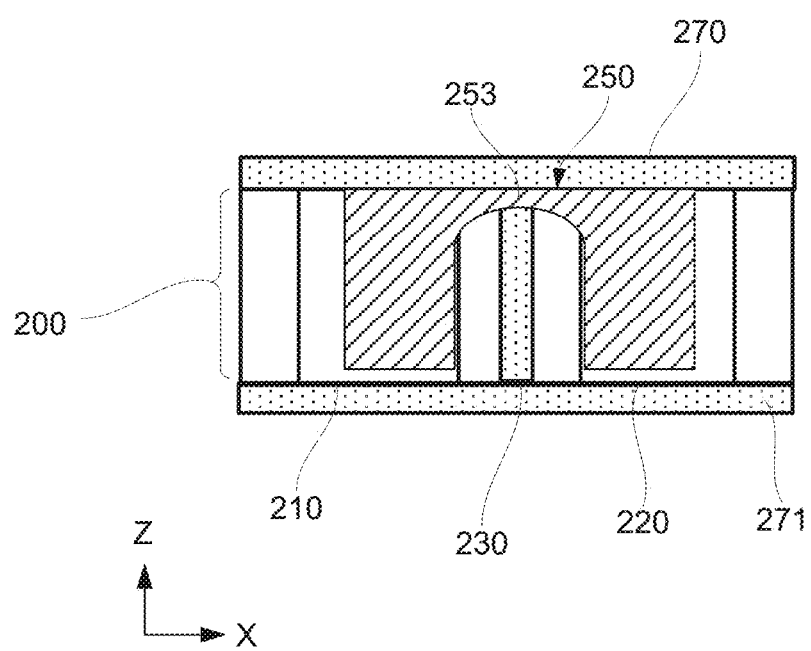
FIG. 2I is a schematic cross-sectional side view of another example of the splice, in accordance with some embodiments.

An example of splice 200 with face sheet 270 positioned over it is presented in FIG. 2I. In this example, face sheet 270 interfaces first honeycomb core 210 and second honeycomb core 220. Face sheet 270 may also interface with adhesive layer 230, which may at least in part support face sheet 270. Furthermore, face sheet 270 may also interface first plurality 240 of tie clips 250. Face sheet 270 is adhered to splice 200 after curing adhesive layer 230, which is further described below. In some embodiments, face sheet 270 and first plurality 240 of tie clips 250 are both made from the same material. For example, face sheet 270 and first plurality 240 of tie clips 250 may be both made from fiberglass. Furthermore, face sheet 270 can be also bonded to tie clips 250. As shown in FIG. 2I, the assembly may include two face sheets 270 and 271 with splice 200 disposed (sandwiched) in between face sheets 270 and 271.

In some embodiments, method 100 further comprising forming face sheet 270 during optional operation 139. Face sheet 270 and first plurality 240 of tie clips 250 may be formed from the same material, such as a fiber reinforced material or, more specifically, a fiberglass.

Method 100 may proceed with curing (operation 150) adhesive layer 230 while first plurality 240 of tie clips 250 is inserted into splice 200. For example, splice 200 may be heated (sub-operation 152) and/or pressurized (sub-operation 154). Furthermore, splice 200 may be shaped (sub-operation 156). One example of shaped splice 200 is shown in FIG. 4. During this collective operation 150, first plurality 240 of tie clips 250 maintains set distance 266 (shown in FIG. 2C) between first honeycomb core 210 and second honeycomb core 220. As such, curing adhesive layer 230 may comprise maintaining this set distance 266 between first honeycomb core 210 and second honeycomb core 220 using first plurality 240 of tie clips 250, as reflected by operation 160 in FIG. 1. Furthermore, curing adhesive layer 230 comprises adhering first plurality 240 of tie clips 250 to adhesive layer 230, as reflected by operation 162 in FIG. 1.

In some embodiments, adhesive layer 230 expands during curing operation 150. This expansion may cause first leg 251 of tie clip 250 to come in contact with wall 213 of full cell 212 as, for example, shown in FIG. 2D. Furthermore, this expansion may cause second leg 252 of same tie clip 250 of first plurality 240 to come in contact with wall 223 of full cell 222, which is also shown in FIG. 2D. After contacting walls 213 and 223, tie clip 250 will prevent further separation of honeycomb cores 210 and 220. Adhesive layer 230 may continue to expand without changing the relative position of honeycomb cores 210 and 220. For example, adhesive layer 230 may be expanded into open cells of honeycomb cores 210 and 220. In other words, tie clips 250 hold honeycomb cores 210 and 220 together in proper relationship during adhesive layer 230 curing. In some embodiments, legs 251 and 252 of tie clip 250 may be equal to the width (in the X direction) of full cells 212 and 222 such that tie clip 250 is in contact with wall 213 of full cell 212 and wall 223 of full cell 222 at the time of the insertion of tie clip 250. As such, tie clip 250 may prevent expansion of adhesive layer 230 right from start. Furthermore, tie clip 250 may prevent for honeycomb cores 210 and 220 from getting closer to each other (e.g., if adhesive layer 230 shrinks).

After completing curing operation 150, first plurality 240 of tie clips 250 is adhered to adhesive layer 230 and integrated into splice 200. In other words, first plurality 240 of tie clips 250 cannot be removed from splice 200. In some embodiments, splice 200 may be buried under other components, such as face sheet 270, which may be also bonded to splice 200 during cure operation 150.

As such, curing adhesive layer 230 may comprise contacting wall 213 of full cell 212 of first honeycomb core 210 with first leg 251 of at least one of first plurality 240 of tie clips 250 and contacting wall 223 of full cell 222 of second honeycomb core 220 with second leg 252 of same one of first plurality 240 of tie clips 250, as reflected by optional operation 164 in FIG. 1.

Also provided is splice 200. Slice 200 may comprise first honeycomb core 210, second honeycomb core 220, adhesive layer 230, and first plurality 240 of tie clips 250.

Different views and examples of such splice 200 are presented in FIGS. 2C-2I. Adhesive layer 230 is disposed between and directly interfaces first honeycomb core 210 and second honeycomb core 220. First plurality 240 of tie clips 250 is inserted into splice 200. Specifically, each tie clip 250 of first plurality 240 of tie clips 250 comprises first leg 251, second leg 252, and bridging portion 253 extending between first leg 251 and second leg 252. First leg 251 of each tie clip 250 is inserted into full cell 212 of first honeycomb core 210. Second leg 252 of each tie clip 250 is inserted into full cell 222 of second honeycomb core 220. Bridging portion 253 extends across adhesive layer 230. First plurality 240 of tie clips 250 is adhered to adhesive layer 230 and integrated into splice 200 after curing adhesive layer 230. Other aspects of splice 200 are presented above with reference to method 100 of forming splice 200.

FIGS. 6A-6E are photographs of actual test splices at various fabrication stages.

Figure 6A:
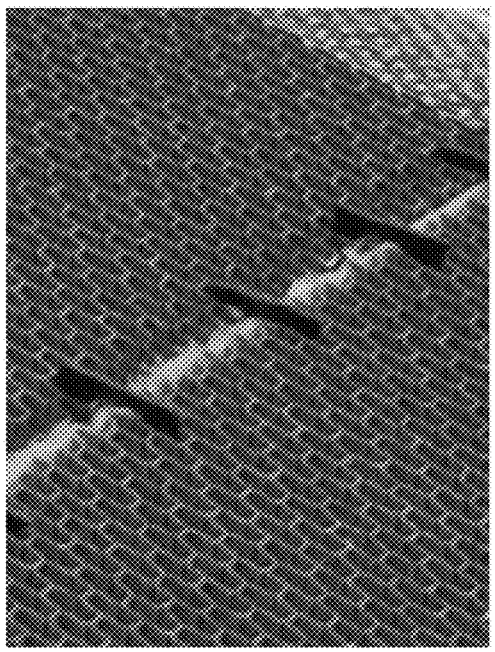
FIGS. 6A-6E are photographs of actual test splices at various fabrication stages.
Figure 6B:
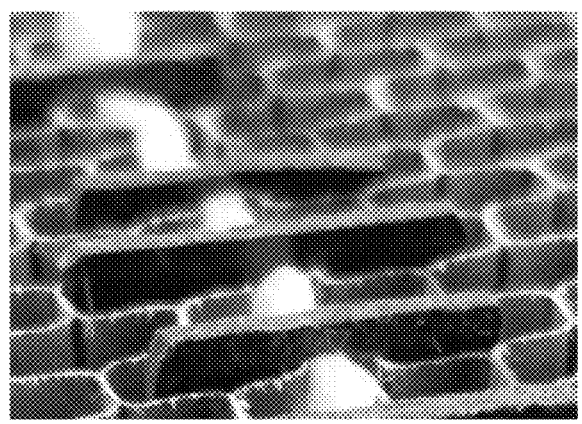
Figure 6C:
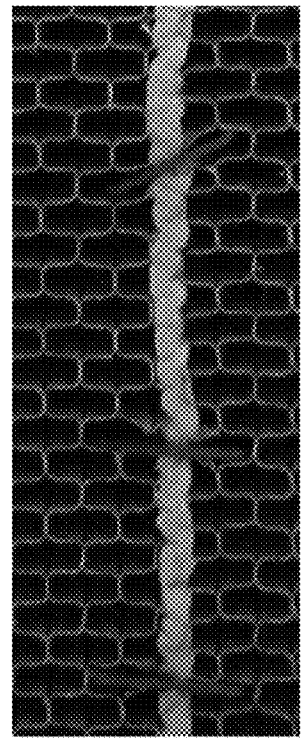
Figure 6D:
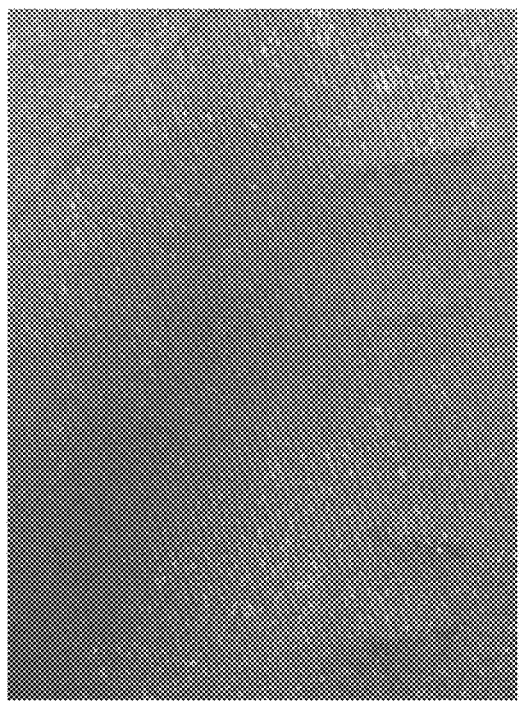
Figure 6E:
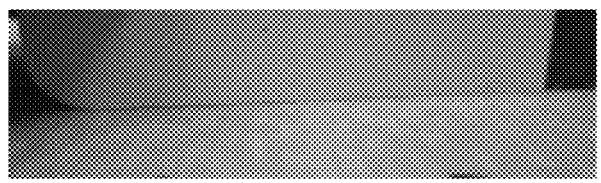
Figure 7:
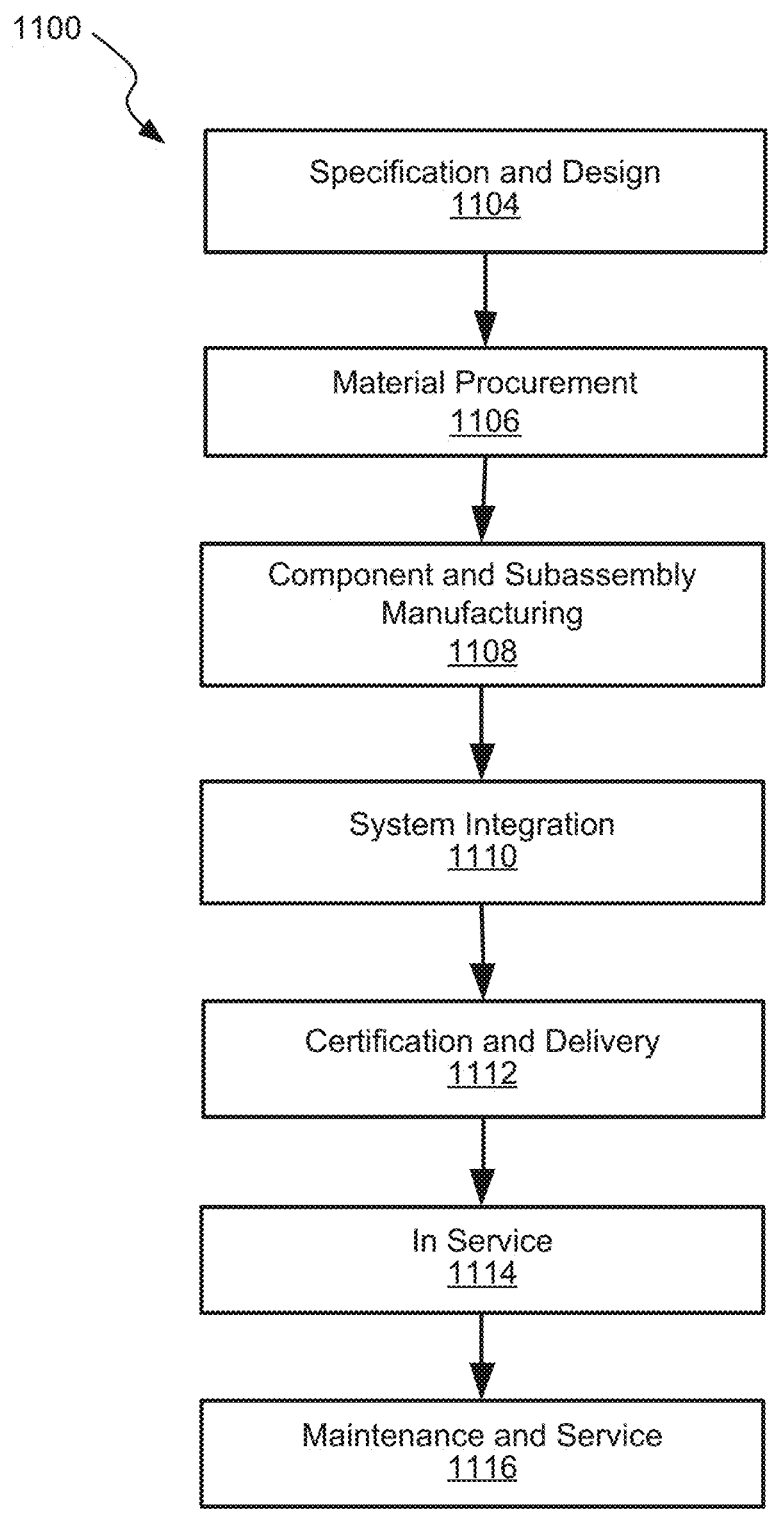
FIG. 7 is a block diagram of aircraft production and service methodology that may utilize methods and systems for adhering honeycomb cores described herein.

Specifically, FIG. 6A illustrates two honeycomb cores with an adhesive layer disposed between the structures and tie clips inserted into full cells of these structures. FIG. 6B is a close-up photo of a similar sample. FIG. 6C is a top down photo of yet another similar sample. In these examples, the tie clips extend above the first faces of the honeycomb cores. The tie clips may be further pressed into these structures and adhesive layer to ensure that the first face of the overall assembly is flat. FIGS. 6D and 6E are photos of test splices with face sheets positioned over honeycomb cores and tie splices. In fact, a few tie splices are visible through the face sheet in FIG. 6D. The example presented in FIG. 6E has a flat surface.

Examples of Aircraft and Methods of Fabricating and Operation Aircraft

Figure 8:
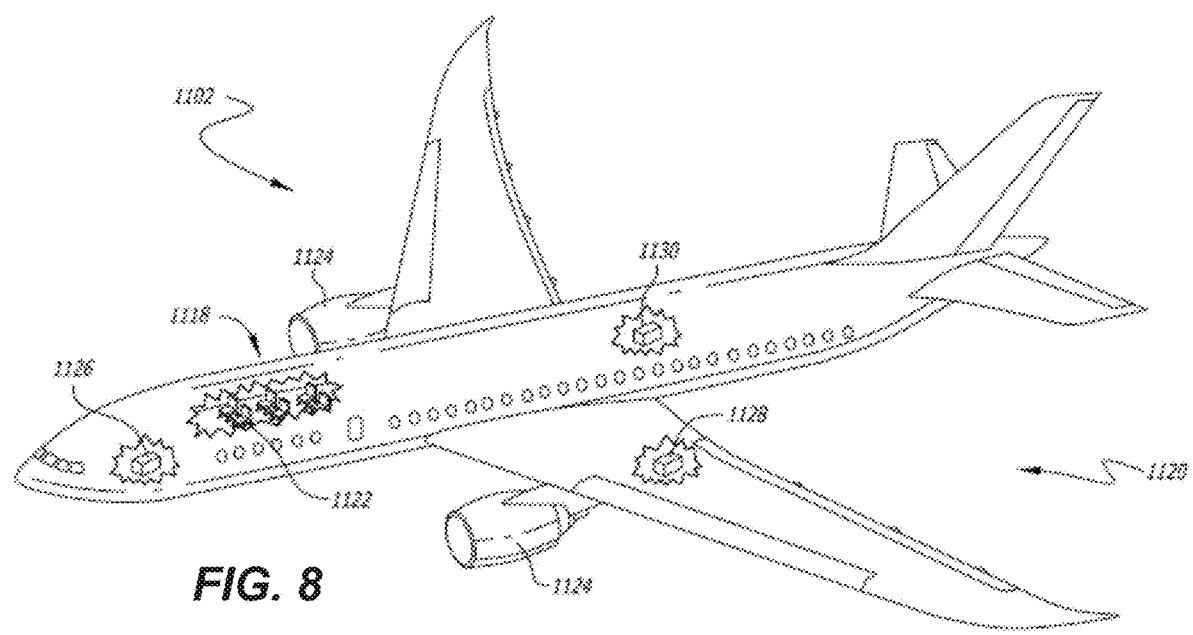
FIG. 8 is a schematic illustration of an aircraft that may include splices formed by adhering honeycomb cores described herein.

Examples of the present disclosure may be described in the context of aircraft manufacturing and service method 1100 as shown in FIG. 8 and aircraft 1102 as shown in FIG. 9. During pre-production, illustrative method 1100 may include specification and design (block 1104) of aircraft 1102 and material procurement (block 1106). During production, component and subassembly manufacturing (block 1108) and inspection system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more inspection systems of aircraft 1102. Methods of forming splices comprising honeycomb cores and adhesive layers with tie clips supporting the honeycomb cores may be performed during one or more of these stages, such as operations 1106, 1108, and 1116.

Each of the processes of illustrative method 1100 may be performed or carried out by an inspection system integrator, a third party, and/or an operator (e.g., a customer). For the purposes of this description, an inspection system integrator may include, without limitation, any number of aircraft manufacturers and major-inspection system subcontractors, a third party may include, without limitation, any number of vendors, subcontractors, and suppliers; and an operator may be an airline, leasing company, military entity, service organization, and so on. The described methods and systems be used on during specification and design (block 1104) of aircraft 1102 and component and subassembly manufacturing (block 1108). For example, various composite structures used for airframe and interior may be splices comprising honeycomb cores and adhesive layers with tie clips supporting the honeycomb cores.

As shown in FIG. 9, aircraft 1102 produced by illustrative method 1100 may include airframe 1118 with a plurality of high-level inspection systems 1120 and interior 1122, which may include the one or more flush mountable bottle openers. Examples of high-level inspection systems 1120 include one or more of propulsion inspection system 1124, electrical inspection system 1126, hydraulic inspection system 1128, and environmental inspection system 1130. Any number of other inspection systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of manufacturing and service method (illustrative method 1100). For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages (bock 1108) and (block 1110), for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

CONCLUSION

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A splice comprising:
   a first honeycomb core, comprising a first face and a second face, opposite of the first face;
   a second honeycomb core;
   a first tie clip, comprising:
      a first leg inserted into the first honeycomb core,
      a second leg inserted into the second honeycomb core, and
      a bridging portion, connecting the first leg and the second leg and adjacent to the first face; and
   a second tie clip, comprising a bridging portion, adjacent to the second face.

2. The splice of claim 1, further comprising an adhesive layer, disposed between and directly interfacing the first honeycomb core and the second honeycomb core.

3. The splice of claim 2, wherein the bridging portion of each of the first tie clip protrudes through the adhesive layer.

4. The splice of claim 1, wherein the bridging portion comprises a top edge, the top edge being flush with the first face of the first honeycomb core.

5. The splice of claim 1, wherein the bridging portion protrudes through a cell wall of the first honeycomb core.

6. The splice of claim 1, wherein the splice is an aircraft structure.

7. A sandwich panel splice comprising:
   a first honeycomb core, comprising a full cell, having a wall;
   a second honeycomb core, having a full cell, having a wall; and
   a first tie clip, being a pre-impregnated composite lamina sheet and comprising a first leg, a second leg, and a bridging portion,
      the first leg being inserted into the full cell of the first honeycomb core and adjacent to the wall of the full cell of the first honeycomb core,
      the second leg being inserted into the full cell of the second honeycomb core and adjacent to the wall of the full cell of the second honeycomb core, and
      the bridging portion attaching the first leg and the second leg across a gap between the full cell of the first honeycomb core and the full cell of the second honeycomb core.

8. The sandwich panel splice of claim 7, wherein the first leg contacts the wall of the full cell of the first honeycomb core.

9. The sandwich panel splice of claim 7, wherein the second leg contacts the wall of the full cell of the second honeycomb core.

10. The sandwich panel splice of claim 7, wherein the bridging portion protrudes through the wall of the full cell of the first honeycomb and the wall of the full cell of the second honeycomb.

11. A method of forming a splice, the method comprising:
    placing a first leg of a first tie clip into a full cell of a first honeycomb core, comprising a first face and a second face, opposite of the first face;
    placing a second leg of the first tie clip into a full cell of a second honeycomb core, different from the first honeycomb core;
    bridging between the first leg and the second leg with a bridging portion of the first tie clip, adjacent to the first face; and
    inserting a second tie clip into the first honeycomb core and the second honeycomb core, the second tie clip comprising a bridging portion, adjacent to the second face.

12. The method of claim 11, wherein bridging between the first leg and the second leg comprises bridging across a gap between the first honeycomb core and the second honeycomb core using a bridging portion of the first tie clip connected to each of the first leg and the second leg.

13. The method of claim 12, further comprising protruding the bridging portion into an adhesive layer disposed between the first honeycomb core and the second honeycomb core.

14. The method of claim 12, further comprising protruding the bridging portion into a wall of the full cell of a first honeycomb core and a wall of the full cell of a second honeycomb core thereby making a top edge of the bridging portion flush with the first face of the first honeycomb core.

15. The method of claim 11, further comprising positioning a face sheet over the first honeycomb core and the second honeycomb core.

16. The method of claim 15, wherein the face sheet directly interfaces each of the first honeycomb core and the second honeycomb core.

17. The method of claim 15, further comprising positioning an additional face sheet over the first honeycomb core and the second honeycomb core, such that the first honeycomb core and the second honeycomb core are positioned between the face sheet and the additional face sheet.

18. The method of claim 11, further comprising, after bridging, changing shape of the splice.

19. The method of claim 11, further comprising contacting a wall of the full cell of the first honeycomb core with the first leg of the first tie clip while placing the first leg of the first tie clip into the full cell of the first honeycomb core.

20. The method of claim 11, further comprising contacting a wall of the full cell of the second honeycomb core with the second leg of the first tie clip while placing the second leg of the first tie clip into the full cell of the second honeycomb core.

* * * * *